Figure 1:
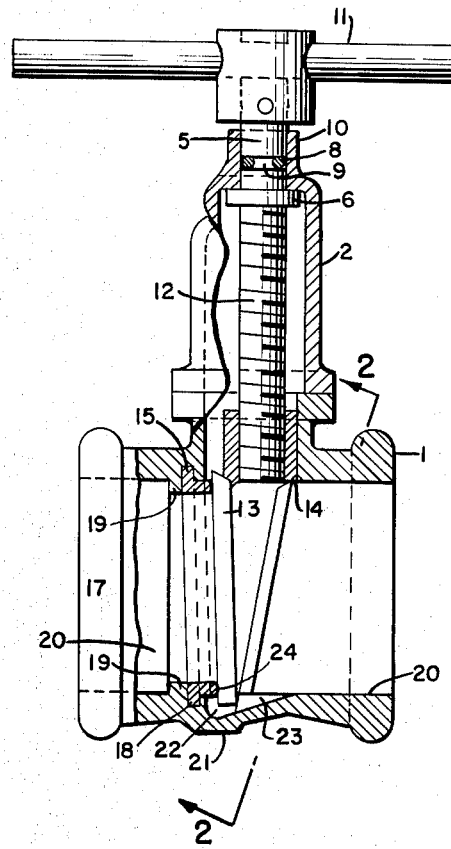

Oct. 5, 1965   H. A. PEARSE   3,209,776
AUTOMATIC SEDIMENT REMOVAL MEANS FOR PORTWAYS
OF GATE VALVES AND THE LIKE
Filed Aug. 10, 1962

INVENTOR
Harvey A. Pearse

BY *Spencer & Kaye*

ATTORNEYS

United States Patent Office 3,209,776
Patented Oct. 5, 1965

3,209,776
AUTOMATIC SEDIMENT REMOVAL MEANS FOR PORTWAYS OF GATE VALVES AND THE LIKE
Harvey A. Pearse, 759 Belmont Place E., Seattle, Wash.
Filed Aug. 10, 1962, Ser. No. 216,108
1 Claim. (Cl. 137—238)

This invention relates, generally, to improvements in single-seat gate valves, or the like, having only a single valve seat, and particularly to means for automatically cleaning the interior of the valve by removal of accumulated sediment lodged adjacent the seating surfaces of the valve within the portway thereof.

In apparatus such as gate valves passage of fluid between the opposite sides of the valve can be controlled by the movement of a gate, or the like, relative to a seating surface provided within the valve portway. In the course of manual closing the gate is wedged against the seating surface enforcing the projection of the lower end of the gate into an interior recess defined by walls formed by the body structure retaining the seating surface thereof. Experience in operation of valves demonstrates that in certain areas of use and operation foreign sedimentary particles such as sand and pebbles or sediment may be entrained in the fluid passing through the valve portway; some such particles may separate from the fluid and be deposited and accumulate in and be retained within such recess and this accumulation may, in some instances, become a sizeable solid mass in this recess thereby preventing complete closure of the gate upon the seating surface thus subjecting the valve structure and parts thereof to damage due to unusual forces applied to attempt complete, fluid tight, closure of the valve gate.

In order to overcome the difficulties and disadvantages incident to the accumulation of foreign particles and sediment in said recess it has been necessary heretofore to provide cleanout aperture in the body structure adjacent the seating surfaces whereby such accumulations may be manually removed from such recess by taking off portable plates or closures from the aperture, manually blowing, or scraping, out the valve interior and to refit plates.

It is an object of this invention to provide within such fluid flow portway an especially formed structural element whereby fluid in passing through said portway automatically, through co-action of other closure elements, may induce a turbulence thereby preventing settling of the foreign particles within said recess.

In some installations such gate valves are exposed to excessive ambient temperatures and under such conditions, as in irrigation systems, where under operative conditions the valves may be partially closed, without fluid flowing therethrough, and the sediment and entrapped fluid combined in the recess under hot sun causes such accumulation to bake and solidify to the extent the recess may be so filled with the baked mass that subsequent closure of the gate within the valve is impossible.

Such a condition of a hard mass requires manual removal with suitable hand tools, is time consuming and thus costly.

It is an object of this invention to provide in such portway a simple structural body formation, as a fluid operative means, whereby the accumulation of sediment adjacent the seating surface may be discharged during successive manual operation of the valve elements.

It is a feature and advantage of this invention that the means to produce such cleansing action and removal of accumulated sediment may automatically function by the passage of all fluid from one inlet side of said body portway, thence through the seating surface fluid passage area to the opposite outlet, side of said body, without interjection of externally controlled air jets or fluid means to agitate accumulated sediment.

It is a further feature and advantage of this invention that the automatic functioning of such cleansing action, operation, of this valve shall be provided only by the structural form of a portion of the valve body itself in cooperation with movable operative elements of the gate valve thus reducing the cost of including this cleansing means to accomplish the sediment removal.

The foregoing and other features and advantages have been realized according to this invention by the novel position and novel combination of the cleansing channel element with relation to the gate and the seating surface elements of this valve described and illustrated hereinbelow which are preferably all employed in combination so as to obtain the benefits and advantages of this invention.

Thus a simple partial conical form of opensided channel is provided to assist in producing fluid turbulence may be varied in its form and location from that shown in the drawings herein referred to without departing, adversely affecting or detracting from desired operation of the combined co-acting elements.

Figure 2:
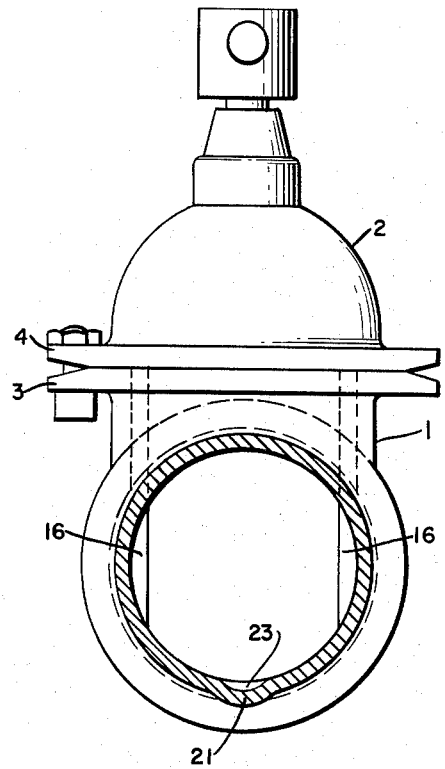
Figure 3:
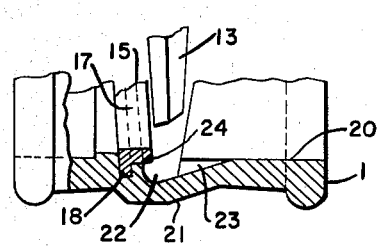

The foregoing and other purposes, features and advantages of this invention will become apaprent from an examination of the following description of a typical embodiment of this invention as illustrated for exemplary purposes in connection with a gate valve construction such description being in connection with the accompanying drawings, wherein FIGURE 1 is a sectional elevation of an exemplary gate valve with which the present invention may be employed;

FIGURE 2 is a partial sectional elevation of the gate valve shown in FIGURE 1, the showing being principally in section through the approximate vertical center section thereof in order to illustrate the portway thereof and the relationship of part of the invention herein relative to said portway;

FIGURE 3 is a fragmentary sectional view corresponding with the section of FIGURE 2, but with certain operative elements shown in proper relationship to the seating surface within the body itself and for clarification of structural form of the turbulence inducing channel formed within the body relative to various operative positions of the shutoff gate permitting increased fluid flow past the gate and through the valve fluid portway.

Referring to FIGURES 1 to 3, this invention has been illustrated as embodied in the gate valve shown comprises a valve body provided with a bonnet 2 which is secured to body 1 by the flange 3 on the body bolted to flange 4 on the bonnet.

The valve stem 5 having a collar 6 is rotatably mounted with reference to bonnet 2 and any suitable packing and packing housing arrangement such as is indicated generally by the reference character 8 indicating a resilient O ring stem packing construction which may be carried in a suitable groove 9 in the stem 5 or in the bonnet packing housing 10 or such packing for the stem may be the conventional stem packing means (not shown), used generally for stem packing.

The upper end of the stem 5 is provided with a handle 11 and the lower end 12 of the stem 5 is threaded and carries the gate 13 having a boss 14 in threaded relation to stem 5 so that upon rotation of the stem in one direction or the other the gate may be raised or lowered relative to the valve body and the portways therein for opening or closing the passage defined by the flow opening area in the seat ring 15 between the portways. The movement of the gate may be appropriately guided by the ribs 16 integral with the body and upon which the gate bears in its movement upward or downward.

Gate valve construction such as that described above is conventional and it is to be understood that the particular construction as described and shown in the drawings is merely illustrative of the design of the sediment removal means applied to gate valves having a single seating surface (mono-faced), construction.

A typical portway and turbulence inducing channel combination as embodied in this invention is shown in FIGURES 1, 2 and 3; incorporated in the gate valve construction above described and the following description is applicable to the particular form and combination of the channel and portways.

The valve body 1 has the portway 20 which presents the annular seat ring 15 provided with a terminal seal surface 24 and defines a fluid passage area 17, through which all fluid entering the valve must flow to the outlet, the seat is retained in an annular groove 18 within a partial partition wall 19 between the portway at the right side of the body and the portway at the left side. The structure of body 1 is enlarged at its bottom portion as at 21 to accommodate the larger diameter of the gate 13 thus forming a partial annular recess 22 merging with the body structure at the sides thereof; into the recess 22 the flow sediment is deposited under normal operative conditions of fluid flow.

The channel 23 is normally formed with its greatest width adjacent the center portion of said gate at its lower end where the channel merges into the recess 22; the apex of the segmental cone defining said channel is spaced at a suitable distance from the recess 22, so as to provide sufficient swirling and turbulence, and terminates in the portway surface.

FIGURE 2 illustrates in greater detail the normal form of the channel where it merges into the recess 22.

Under conditions of installation fluid within the portway 20 flows from the right and is stopped by the gate 13, as shown in FIGURE 1, from further movement; when fluid is desired to be delivered through portway at the left side of the gate the handle 11 is rotated thus progressively opening results in greater fluid flow past the gate opened as shown in FIGURE 2, thus permitting flow only of fluid through the passage area 17 in seat ring 15 into the portway at the left side and opposite its point of entry into the portway.

Thus a portion of the full quantity of fluid flowing into and through the right side portway passes through open channel 23 and by its kinetic swirling turbulent action causes sediment in the recess 22 to be entrained in the fluid flow and passes only through passage 17 in seat 15 and out through left side portway automatically cleansing said recess and permitting complete fluid-tight closure of the sealing surface 24 of gate 13 on the terminal sealing face on seat 15.

I claim:

A single-seat gate valve for regulating the amount of fluid flowing in a conduit, said gate valve comprising, in combination:

means forming an inlet conduit for carrying fluid to the gate valve;

means forming an outlet conduit for carrying fluid away from the gate valve;

means forming a portway between said inlet conduit means and said outlet conduit means;

an annular valve seat member disposed in said portway substantially at right angles to the longitudinal axis thereof for conducting the total volume of fluid flowing into the portway via said inlet conduit, said inlet conduit means, outlet conduit means, and said portway with the annular valve seat member forming an unobstructed passage so that optimum flow is obtained;

a gate disposed in a plane substantially at right angles to said longitudinal axis between the valve seat member and the inlet conduit means and having a flat surface cooperable with said valve seat member to regulate fluid flow from the inlet conduit means to the outlet conduit means;

control means, including a pair of guide members, for moving the gate in a plane substantially perpendicular to the longitudinal axis in a first direction for opening the gate valve and in the opposite direction for closing the gate valve, said closure being effected by contact between the annular valve seat member and the flat surface of said gate;

a partial annular recess provided in said portway outwardly of the lowermost contacting portions of said gate and seat for accumulating sediment from the flowing fluid; and a channel formed by a wall of the portway merging with said partial annular recess, said channel lying on the upstream side of said partial annular recess and being in open and unobstructed communication along its entire length with the fluid flowing in said portway for directing the fluid flow to create turbuluence on said partial annular recess, whereby accumulated sediment therein is discharged through said annular valve seat member to the outlet conduit means.

References Cited by the Examiner

UNITED STATES PATENTS

| 286,656 | 10/83 | Van Wie | 137—238 |
| 727,236 | 5/03 | Wallis et al. | 137—238 |
| 2,273,605 | 2/42 | Wall | 251—329 |

FOREIGN PATENTS

| 501,812 | 3/51 | Belgium. |
| 1,180,828 | 1/59 | France. |
| 426,479 | 3/26 | Germany. |
| 1,048,109 | 12/58 | Germany. |
| 19,005 | 8/96 | Great Britain. |

ISADOR WEIL, *Primary Examiner.*